(12) United States Patent
Nadi et al.

(10) Patent No.: US 12,167,237 B2
(45) Date of Patent: Dec. 10, 2024

(54) SYSTEM, COMPUTER-IMPLEMENTED METHOD AND DEVICES FOR ACTIVE BIOMETRIC AND BEHAVIORAL FINGERPRINTING AUTHENTICATION

(71) Applicant: Mastercard International Incorporated, Purchase, NY (US)

(72) Inventors: Fariborz Nadi, Fairfield, CA (US); Timothy B. McBride, St. Louis, MO (US); Akanksha Mehra, Milpitas, CA (US); Victor Hom, South San Francisco, CA (US); Beth Marie Griffin, Hartland, WI (US)

(73) Assignee: Mastercard International Incorporated, Purchase, NY (US)

( * ) Notice: Subject to any disclaimer, the term of this patent is extended or adjusted under 35 U.S.C. 154(b) by 733 days.

(21) Appl. No.: 17/377,463

(22) Filed: Jul. 16, 2021

(65) Prior Publication Data

US 2022/0022038 A1   Jan. 20, 2022

Related U.S. Application Data

(60) Provisional application No. 63/052,703, filed on Jul. 16, 2020.

(51) Int. Cl.
| | |
|---|---|
| *H04W 12/00* | (2021.01) |
| *G06N 20/00* | (2019.01) |
| *H04W 12/06* | (2021.01) |
| *H04W 12/63* | (2021.01) |

(52) U.S. Cl.
CPC ............ *H04W 12/06* (2013.01); *G06N 20/00* (2019.01); *H04W 12/63* (2021.01)

(58) Field of Classification Search
CPC ....... H04W 12/06; H04W 12/63; G06N 20/00
See application file for complete search history.

(56) References Cited

U.S. PATENT DOCUMENTS

| | | | | |
|---|---|---|---|---|
| 2016/0300053 | A1* | 10/2016 | Kidron | G06F 21/316 |
| 2018/0357407 | A1* | 12/2018 | Yous | G06F 16/29 |
| 2019/0220583 | A1* | 7/2019 | Douglas | G06F 21/316 |

* cited by examiner

*Primary Examiner* — Curtis B Odom
(74) *Attorney, Agent, or Firm* — Hovey Williams LLP

(57) ABSTRACT

A computer-implemented method for authenticating an individual to one or more IoT devices. The method may include: receiving active behavioral data from the personal electronic device; retrieving an active behavioral profile corresponding to the individual; comparing the active behavioral data with the active behavioral profile; and authenticating the individual based at least in part on the comparison.

18 Claims, 3 Drawing Sheets

SYSTEM, COMPUTER-IMPLEMENTED METHOD AND DEVICES FOR ACTIVE BIOMETRIC AND BEHAVIORAL FINGERPRINTING AUTHENTICATION

RELATED APPLICATION

This patent application claims priority to identically-titled U.S. patent application Ser. No. 63/052,703, filed Jul. 16, 2020, the entire contents of which are hereby incorporated herein by reference.

FIELD OF THE INVENTION

The present disclosure generally relates to computer-implemented methods, systems comprising computer-readable media, and electronic devices for authenticating an individual. More particularly, the present disclosure generally relates to authenticating an individual based on data received from a personal electronic device possessed by or in the proximity of the individual, wherein the data are analyzed for active biometric and/or behavioral fingerprinting.

BACKGROUND

Existing authentication technologies are primarily or entirely passive, relying on security challenges and direct responses provided by individuals under authentication scrutiny. One or more of several types of such passive responses may be provided: performance of a pre-determined authentication act in direct response to a challenge issued via a user interface of a personal electronic device or by a querying device, such as input/entry of a pre-determined password or keycode or performance of a pre-determined sequence of gestures; possession of a pre-determined authentication device, such as where a personal electronic device or a querying device issues a challenge that can only reasonably be satisfied through possession of a pre-determined device (e.g., possession of a specific cellular telephone can be proven by entry of one-time code transmitted only to that device); and/or presentation to a sensor of a personal electronic device of a pre-determined aspect of the individual's physical features or manifestations for recordation (e.g., a challenge issued via the personal electronic device for the speaking of certain words, the presentation of a bodily feature such as an iris or a face, or the like).

Passive, challenge-based authentication factors, whether utilized alone or in combination, are often unnecessarily burdensome and/or are not optimized for use across a variety of scenarios. For example, entry of a password or presentation of a physical feature for scanning each time an individual wishes to automatically turn on an HVAC system may be unduly burdensome. However, the complete absence of any form of identification or authentication for performance of such a function may lead to wasted resources and increased utility bills. For another example, it is well known that direct responses to certain challenge types are often highly predictable and may be faked.

Embodiments of the present invention provide improved systems, devices and methods for authentication. This background discussion is intended to provide information related to the present invention which is not necessarily prior art.

BRIEF SUMMARY

Embodiments of the present technology relate to improved computer-implemented methods, systems comprising computer-readable media, and electronic devices for authenticating an individual possessing or in the proximity of a personal electronic device.

In a first aspect, a computer-implemented method may be provided for authentication of an individual having a personal electronic device. The computer-implemented method may include: receiving active behavioral data from the personal electronic device; retrieving an active behavioral profile corresponding to the individual; comparing the active behavioral data with the active behavioral profile; and authenticating the individual based at least in part on the comparison. The method may include additional, less, or alternate actions, including those discussed elsewhere herein.

In another aspect, a system may be provided for authentication. The system may include a personal electronic device of an individual. The personal electronic device may include a communication element and non-transitory computer-readable media having computer-readable instructions instructing completion of the following steps by at least one processing element: receive active behavioral data from the communication element of the personal electronic device; retrieve an active behavioral profile corresponding to the individual; compare the active behavioral data with the active behavioral profile; and authenticate the individual based at least in part on the comparison. The system may include additional, less, or alternate functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
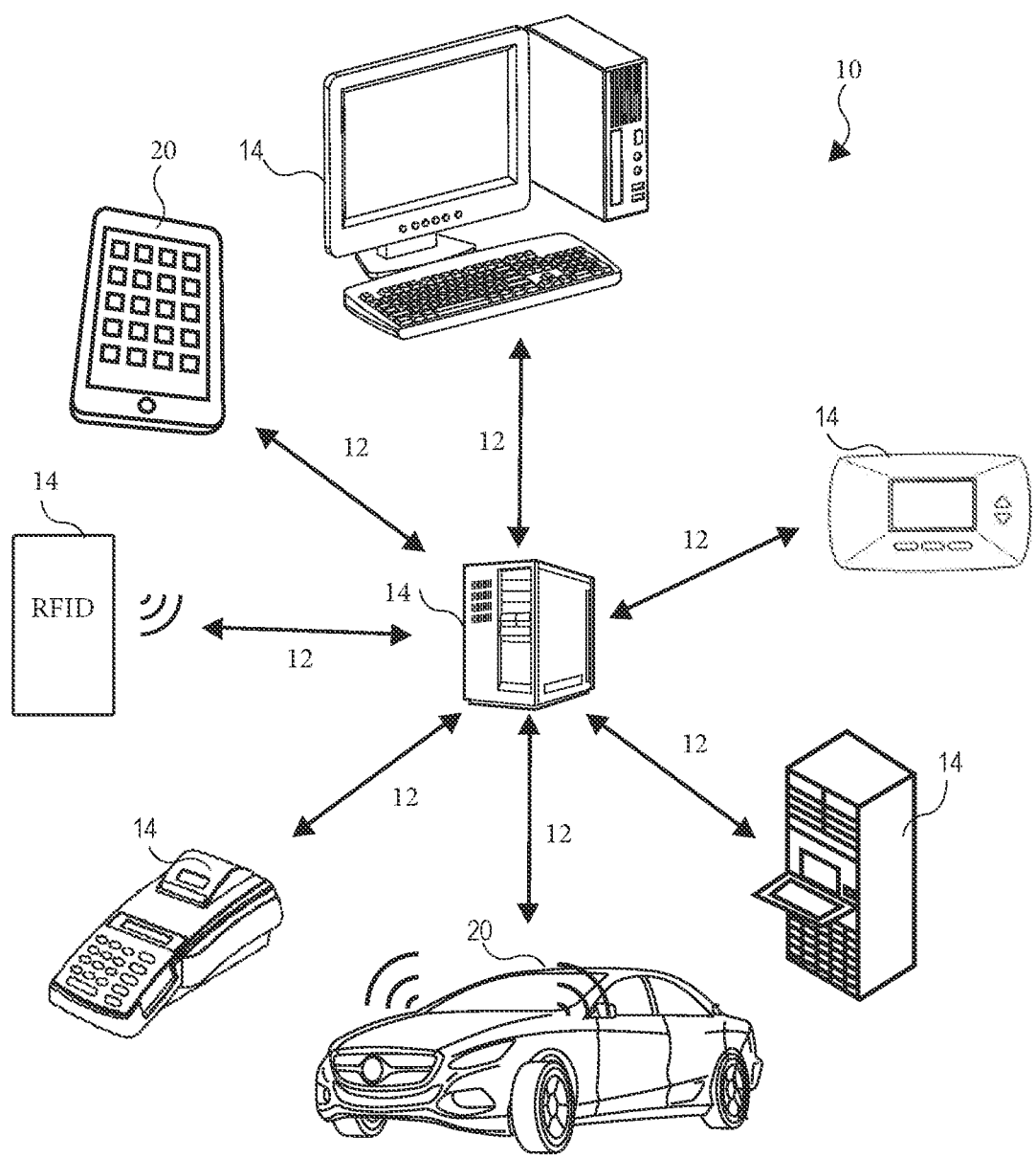
FIG. 1 illustrates various components in schematic form of an exemplary system for authenticating an individual to internet-of-things (IoT) electronic devices according to embodiments of the present invention.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Existing authentication technologies are primarily or entirely passive, relying on security challenges and direct responses provided by individuals under authentication scrutiny. One or more of several types of such passive responses may be provided: performance of a pre-determined authentication act in direct response to a challenge issued via a user interface of a personal electronic device or by a querying device, such as input/entry of a pre-determined password or keycode or performance of a pre-determined sequence of gestures; possession of a pre-determined authentication device, such as where a personal electronic device or a querying device issues a challenge that can only reasonably be satisfied through possession of a pre-determined device (e.g., possession of a specific cellular telephone can be proven by entry of one-time code transmitted only to that device and/or automated reply by the device in response to a challenge); and/or presentation to a sensor of a personal electronic device of a pre-determined aspect of the individual's physical features or manifestations for recordation (e.g., a challenge issued via the personal electronic device for the speaking of certain words, the presentation of a bodily feature such as an iris or a face, or the like).

Passive, challenge-based authentication factors, whether utilized alone or in combination, are often unnecessarily burdensome and/or are not optimized for use across a variety of scenarios.

Embodiments of the present invention provide supplemental and/or replacement active behavioral profile authentication features for added security, accuracy of identification and reduced burden on individuals under authentication scrutiny.

In one or more embodiments, a "querying" device or system is one which seeks authentication as a condition of performance of or authorization for an action requested by an individual or personal electronic device, where the performance is by the querying device or another device. A "querying" device may also be a device that performs one or more operations in support of the authentication query, examples of which are discussed in more detail below.

A querying device may itself issue an authentication query, or perform an authentication procedure, or may rely on the results of such a query/analysis performed by another trusted or querying device, without departing from the spirit of the present invention. For instance, a querying device may manage authentication and permissions for itself and one or more other devices based on a behavioral analysis and matching process performed by a remote server or the like without departing from the spirit of the present invention.

In one or more embodiments, a querying device is configured to complete an authentication procedure as a condition for performing one or more functions or operations requested by an individual under authentication scrutiny (e.g., performing an action in response to a command). The commands or communications issued to the querying device may be pre-programmed, or may be received via a user interface of the querying device or through a communication element of the querying device.

Exemplary functions or operations of the querying device that may be performed may include completion of financial transactions, providing physical access to a space (e.g., entry to a home), divulging secure or sensitive information, controlling smart home functions or operations, providing digital access to a computer system, or any other function or operation that may be performed by a querying device (e.g., an IoT device) in reliance at least in part on successful completion of an authentication procedure.

The authentication procedure generally includes matching active behavioral data against an active behavioral profile. The active behavioral profile may be developed during an enrollment period in which physical states or phenomena, and changes in physical states or phenomena, are monitored for the occurrence of patterns. Where those patterns are likely to be distinguishable from those exhibited by or near other individuals, the patterns may be recorded as part of the active behavioral profile of the individual.

An authentication procedure may be triggered by a particular event (such as by issuance of a command or by another communication by, action by, or proximity of the individual under authentication scrutiny), or may be performed continuously (e.g., by monitoring the subject individual or personal electronic device and performing rolling analyses to determine whether/when behavior deviates from the active behavioral profile), with a pre-determined frequency or according to other interval(s) without departing from the spirit of the present invention. Accordingly, a person of ordinary skill will appreciate that initiation of such an authentication procedure may be encoded in the authentication program of any querying device and/or in the personal electronic device(s), or within another device within the scope of the present invention.

Similarly, recordation of active behavioral data for authentication analyses/matching may be triggered by a particular event (such as by issuance of a command or by another communication by, action by, or proximity of the individual under authentication scrutiny and/or receipt of an authentication query), or may be performed continuously (e.g., monitoring the subject individual on a continuous basis), with a pre-determined frequency or according to other interval(s) without departing from the spirit of the present invention. Accordingly, a person of ordinary skill will appreciate that initiation of such data gathering may be encoded in the authentication program of the querying device(s) or of the personal electronic device, or within another device, within the scope of the present invention.

The authentication procedure, authentication analyses and/or matching, and/or generation of the active behavioral profile(s) may be performed by a processor of the querying device, by a processor of the personal electronic device, by a processor of a trusted querying device comprising a remote server, or by another processor involved in the authentication procedure.

The authentication procedure may comprise comparing observed active behavioral data reflecting physical states and phenomena proximate the individual against the active behavioral profile developed during the enrollment process. If a sufficient threshold for matching the active behavioral data against the active behavioral profile is reached in the comparison, the analyzing processor may issue an authentication message or confirmation of the authentication, permitting performance of requested functions or operations by one or more of the querying devices.

The active behavioral data may be captured and/or transmitted by a plurality of personal electronic devices. In one or more embodiments, a telematics device of a vehicle owned by the individual, an onboard computer of the vehicle, and the smart phone or other cellular device of the individual may collect and/or report data comprising the active behavioral data, whether separately or collectively. For example, the smart phone may be configured for automatic electronic communication with the telematics device and onboard computer of the vehicle to gather relevant information about the movement and physical status of the vehicle. Moreover, the smart phone may be configured to gather data about the individual and/or his/her environment from its own sensors, databases and/or logs.

Preferably, at least one of the observed aspects reflected in the behavioral data is considerable as "active" input. That is, rather than comprising a pre-determined response to a direct challenge or query of the type outlined above as with passive authentication features, the observed aspects preferably include detectable physical properties and/or changes to physical properties over time which are not responsive to direct challenges issued to the subject individual.

Exemplary active behavioral data include vehicle seat positioning; vehicle geolocation patterns; vehicle sound system operation and programming; vehicle heating/cooling settings, alone or in view of external and internal temperature(s); height and/or movement patterns of the personal electronic device within the vehicle; data entry patterns of the user at a user interface of the personal electronic device; successful completion of past authentication events involving the individual conducted on the smart phone; objects frequently found proximate the photographic element of the smart phone; and other data reflecting behavior and/or physical states of the individual, physical states of the individual's surroundings and/or changes in those physical states.

Additional observed aspects may include: phone position in three-dimensional space indicating posture; phone movements indicating patterns of movement of the individual under authentication scrutiny; timestamp data associated with one or more recorded system event(s) or sensor data acquisitions, which may be associated with normal behavioral patterns of the individual under authentication scrutiny; proximity of at least one personal electronic device and/or querying device to another object or entity; speed of activities of the individual under authentication scrutiny recorded at a user interface, for instance speed and/or quality of input such as typing; video and/or microphone sensor data captured without specific request or challenge to the individual under authentication scrutiny; vehicle speed/directionality; mobile device elevation (e.g., as it relates to vehicle height, if no onboard devices on the car are available to verify its identity); mobile device (e.g., phone) orientation/location within the car; behavioral patterns of the individual under authentication scrutiny with respect to handling a mobile device at a particular time and/or in connection with particular task; proximity of multiple querying devices or other objects (e.g., as recorded by a camera of the mobile device), other such information and/or a combination of any of the foregoing.

In some embodiments, only active input(s) may be utilized for authentication, e.g., to minimize interruption(s) of the individual under authentication scrutiny. However, the one or more active input(s) or data may alternatively be combined with one or more passive authentication features (such as password protection) to provide enhanced protection.

The active behavioral profile may be developed and/or the authentication procedure may be performed at least in part based on machine learning techniques. In one or more embodiments, physical phenomena may be observed and patterns or correlations may be determined through artificial intelligence and machine learning techniques in order to develop the active behavioral profile. For example, actions of an individual may be observed through one or more types of sensor input, such as where a sensor of a user interface observes typing actions revealing habits and patterns of an individual, a gyroscope and/or accelerometer observes phone movement(s) revealing actions that frequently occur in connection with a particular circumstance or stimulus, a location determining element observes proximities of a device to other device(s) and/or entities which reveal habits or patterns of the individual, and so on and so forth. Machine learning techniques may, for example, incorporate a decision tree, deep neural net or the like configured to reach a pass/fail conclusion to authenticate the individual under authentication scrutiny.

One of ordinary skill will appreciate that such machine learning may utilize one or more supervised and/or unsupervised learning techniques, such as where supervised learning is used to train a convolutional neural net to recognize objects indicating an individual under authentication scrutiny is approaching in his/her own car, or where unsupervised learning is used in connection with clustering techniques to correlate data elements commonly appearing together in the life of a particular individual under authentication scrutiny.

Once authentication has occurred, based at least in part on the authentication procedure, the authentication may stay "green" or active for a pre-determined period of time, may be applicable against a certain class of actions to be performed by the querying device(s), may be active until one or more event(s) and/or data occur or are received, or may be otherwise limited in its duration or scope within the scope of the present invention.

Moreover, the authentication may be communicated across multiple IoT or other querying devices, whether by the querying device, by a supporting querying device (i.e., one that does not also perform an end use or function based at least in part on real-time authentication) or otherwise. Such forwarded or transmitted authentications may have a limited life (e.g., according to automatic association with a timer or clock cycle which expires on a pre-determined schedule). Forwarded authentications may be supplemented by recipient querying devices, such as where a secondary authentication procedure must be completed before all or some actions will be performed by the recipient querying device.

In a particular embodiment, an individual may own real property on which a personal residence sits. The residence may include a plurality of fixtures and/or electronic devices in and/or surrounding the residence, the plurality of devices broadly comprising IoT devices. Exemplary IoT devices include flood lights, a television, an HVAC system, a smart home controller, a sound or music system, a garage door, and the like. One or more of these devices may comprise querying devices requiring authentication or other means of identification of an individual or personal electronic device of the individual before initiating operation according to a preset routine and/or a command or other input from the individual or a personal electronic device.

Operation of each IoT device may be governed by different logic or program(s), such as where the HVAC system seeks only confirmation that at least one of a group of five (5) individuals is approaching the residence in order to initiate operation, but the music system requires more specific identification of an approaching individual in order to choose a playlist tailored for that individual. Each IoT or querying device may manage all or a subset of an authentication process outlined herein, or may outsource same to other querying device(s) (such as the smart home controller, which may be a managing querying device and/or supporting querying device) for more efficient use of system resources, without departing from the spirit of the present invention.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

EXEMPLARY SYSTEM

FIG. 1 depicts an exemplary environment in which embodiments of a system 10 may be utilized for authenticating an individual to one or more IoT devices. The environment may include communication links 12 for enabling electronic communications between components of the system 10. The system 10 may include querying devices 14 and one or more personal electronic devices 20. The querying devices 14 may manage enrollment of an individual and the personal electronic devices 20 for authentication processes, as described in more detail below. The querying devices 14 may also manage real-time authentication of the individual following enrollment, also as described in more detail below. One of ordinary skill will appreciate, however, that enrollment and subsequent authentication functions may be performed by different physical computing devices, though they may be described herein as being substantially performed by one or more of the querying devices 14 for ease of reference.

Figure 4:
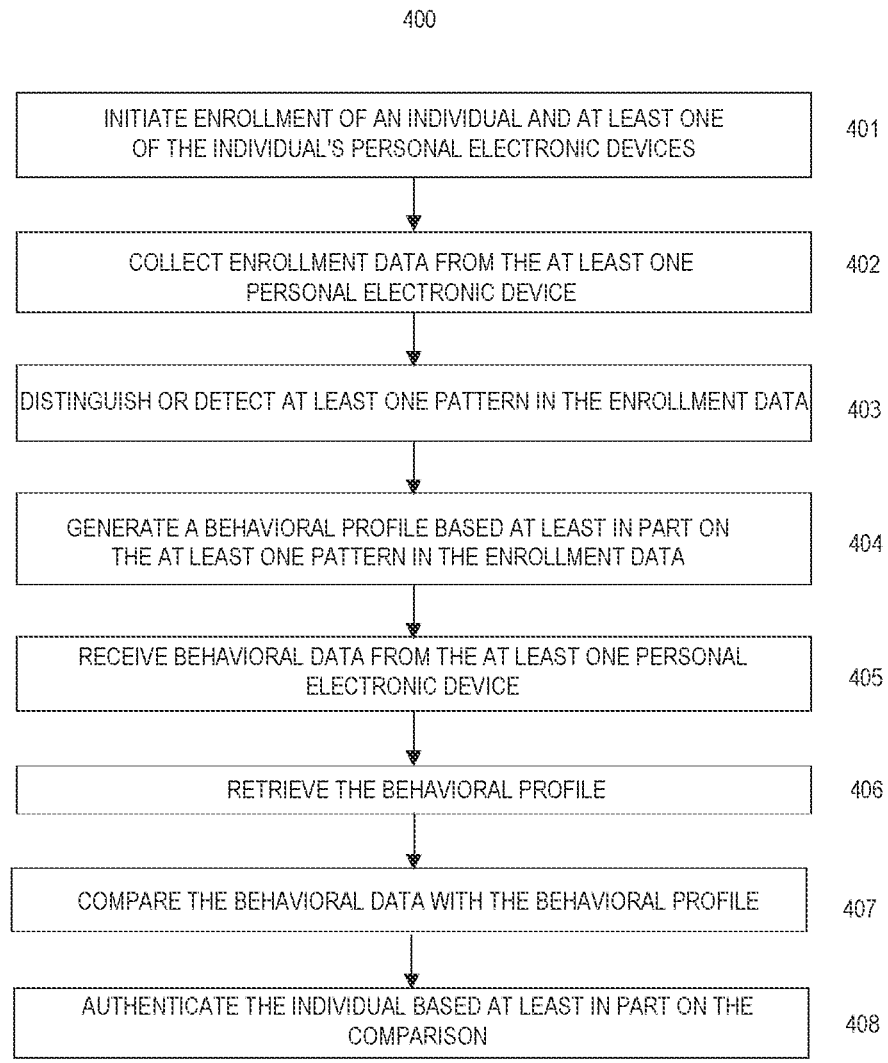
FIG. 4 illustrates at least a portion of the steps of an exemplary computer-implemented method for authenticating an individual to internet-of-things (IoT) electronic devices according to embodiments of the present invention.

Each personal electronic device 20 may optionally execute an authentication program 22 for managing at least some of the steps of embodiments of the present invention exemplified in FIG. 4 hereof. Likewise, the querying device 14 may execute a querying device program 26 for managing at least some of the steps for enrollment and authentication of individuals and personal electronic devices 20 set out in FIG. 4.

Broadly, the communication links 12 may allow communication between the personal electronic devices 20 and the querying devices 14. One or more of the communication links 12 may include or comprise local area networks, metro area networks, wide area networks, cloud networks, the Internet, cellular networks, plain old telephone service (POTS) networks, and the like, or combinations thereof. The communication links 12 may be wired, wireless, or combinations thereof and may include components such as modems, gateways, switches, routers, hubs, access points, repeaters, towers, and the like. For example, the personal electronic devices 20 may generally connect to the communication links 12 and/or to the querying devices 14 or other personal electronic devices 20 wirelessly, such as radio frequency (RF) communication using wireless standards such as cellular 2G, 3G, 4G, or 5G, Institute of Electrical and Electronics Engineers (IEEE) 802.11 standards such as WiFi, IEEE 802.16 standards such as WiMAX, Bluetooth®, or combinations thereof. Also or alternatively, the personal electronic devices 20 may generally connect to the communication links 12 and/or to the querying devices 14 via Bluetooth® wireless communication protocol in general, or the Bluetooth® low energy (BLE) protocol. The personal electronic devices 20 may also generally include electrical power sources housed in small boxes or packages for powering the components thereof outlined herein.

The querying devices 14 may include or comprise: personal electronic devices such as smartphones, smart watches, tablets, desktop computers, laptop computers or the like; application servers, communication servers, database servers, file servers, gaming servers, mail servers, print servers, web servers; smart home controllers; HVAC controllers; sound systems; lighting systems; home entertainment systems; motor-actuated garage door operation systems; or the like, and any other computing, electronic and/or IoT devices that may perform an operation or function based at least in part on authentication of an individual, or combinations thereof which are configured to include or execute software such as file storage applications, database applications, email or messaging applications, web server applications, or the like, in addition to and/or in conjunction with the querying device program 26.

The querying devices 14 may perform tasks in order to enroll and/or authenticate an individual associated with personal electronic devices 20, and/or perform other tasks outlined throughout this disclosure.

In one or more embodiments, a first querying device 14 may be configured to enroll an individual and/or one or more personal electronic devices 20 to produce an active behavioral profile according to processes outlined below (e.g., a server), a second querying device 14 may be configured to authenticate an individual based on a comparison of the active behavioral profile against active behavioral data received from the one or more personal electronic devices 20, and a third querying device 14 may be configured to receive a confirmation of the authentication from the second querying device 14 and perform one or more functions or operations requested by the authenticated individual (e.g., performing an action in response to a command or a predetermined configuration). One of ordinary skill will appreciate, however, that more or fewer querying device(s) 14 may perform such function(s), and/or that a portion of the function(s) maybe performed by one or more of the personal electronic device(s), without departing from the spirit of the present invention.

Each querying device 14 may further include a communication element 30, a processing element 34, and a memory element 38.

The personal electronic devices 20 may be embodied by medical devices, personal computers, smart watches, smart phones, personal digital assistants (PDAs), tablets, palmtop or laptop computers, notebooks, smart glasses, wearable and non-wearable electronics (e.g., any IoT device), telematics devices, onboard vehicle computers, other mobile devices or electronic devices that may report data regarding an individual, his or her surroundings and/or behaviors or actions, and any of the physical states or phenomena and/or changes in physical states or phenomena of any of the foregoing.

The personal electronic devices 20 may perform tasks to collect active behavioral data, to receive and respond to requests for transmission of the active behavioral data, and/or to perform computations or operations in support of other authentication tasks outlined herein.

Figure 3:
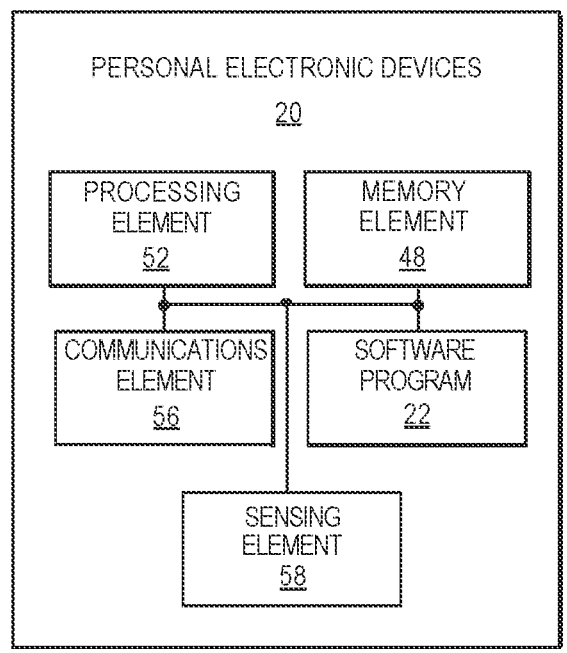

Each personal electronic device 20 may include a memory element 48, a processing element 52, a communications element 56, and a sensing element 58, as seen in FIG. 3. The memory element 48 may store the software program 22, and the processing element 52 may execute the software program 22.

The communication elements 30, 56 may allow communication between one another and/or with external systems or devices. The communication elements 30, 56 may include signal or data transmitting and receiving circuits, such as antennas, amplifiers, filters, mixers, oscillators, digital signal processors (DSPs), and the like. The communication elements 30, 56 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth®, or combinations thereof. Alternatively, or in addition, the communication elements 30, 56 may establish communication through connectors or couplers that receive metal conductor wires or cables which are compatible with networking technologies such as ethernet. In certain embodiments, the communication elements 30, 56 may also couple with optical fiber cables. The communication elements 30, 56 may be in communication with or electronically coupled to memory elements 38, 48 and/or processing elements 34, 52.

The memory elements 38, 48 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory elements 38, 48 may include, or may constitute, a "computer-readable medium." The memory elements 38, 48 may store the instructions, code, code segments, software, firmware, programs, applications, apps, services, daemons, or the like that are respectively executed by the processing elements 34, 52. The memory elements 38, 48 may also store settings, data, documents, sound files, photographs, movies, images, databases, and the like. For example, the memory element 38 may store and maintain a database, and the memory element 48 may comprise non-volatile memory configured to store, among other things, an active behavioral profile associated with an individual subject of an authentication query.

The processing elements 34, 52 may include processors. The processing elements 34, 52 may include digital processing unit(s). The processing elements 34, 52 may include microprocessors, microcontrollers, DSPs, field-programmable gate arrays (FPGAs), analog and/or digital application-specific integrated circuits (ASICs), or the like. The processing elements 34, 52 may include combinations of any of the foregoing. The processing elements 34, 52 may generally execute, process, or run instructions, code, code segments, software, firmware, programs, applications, apps, processes, services, daemons, or the like. The processing elements 34, 52 may also include hardware components, such as finite-state machines, comparators, sequential and combinational logic, and other electronic circuits that may perform the functions necessary for the operation of embodiments of the current inventive concept. The processing elements 34, 52 may be in communication with the other electronic components through serial or parallel links that include address busses, data busses, control lines, and the like.

The sensing element 58 may be in electronic communication with one, two or three of the processing element 52, the memory element 48 and the communications element 56. The sensing element 58 may comprise or include one or more of the following sensor types: a photographic element (such as a camera of a mobile phone); one or more of 5-wire resistive, surface capacitive, projected capacitive, surface acoustic wave and infrared sensor(s) (for example, as integrated with a touchscreen of a user interface); a gyroscope; a motion sensor; an accelerometer; a proximity sensor; an ambient light sensor; a fingerprint sensor; a pedometer; a heart rate sensor; a barometer; a motion detector; a contact sensor; a location determining element (including, for example, an antenna or receiver for receiving satellite signals and processors, controllers or other computing devices for determining current geolocation, e.g., via a "GPS" system); a microphone; a magnetometer; a weight sensor; a thermometer; or another sensor for detection and generation of data regarding an individual, his or her surroundings and/or behaviors or actions, and any of the physical states or phenomena and/or changes in physical states or phenomena of any of the foregoing.

EXEMPLARY AUTHENTICATION METHOD

Figure 2:
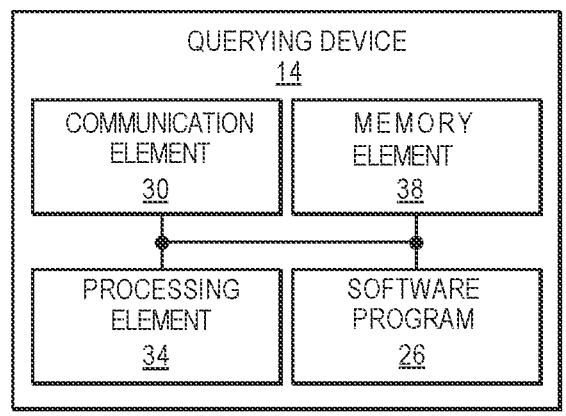
FIGS. 2 and 3 illustrate various components of exemplary querying and personal electronic devices shown in block schematic form that may be used with the system of FIG. 1.

FIG. 4 depicts a listing of steps of an exemplary computer-implemented method 400 for enrolling and authenticating an individual and/or a personal electronic device. Some steps may be performed concurrently as opposed to sequentially, and may in some cases be performed in a different order. In addition, some steps may be optional. The computer-implemented method 400 is described below, for ease of reference, as being executed by exemplary devices and components introduced with the embodiments illustrated in FIGS. 1-3. For example, the steps of the computer-implemented method 400 may be performed by the querying device 14, and at least in part by the personal electronic devices 20, and/or communication links 12 through the utilization of processors, transceivers, hardware, software (such as the software applications 22, 26 described herein), firmware, or combinations thereof. However, a person having ordinary skill will appreciate that responsibility for all or some of such actions may be distributed differently among such devices or other computing devices without departing from the spirit of the present invention.

One or more computer-readable medium(s) may also be provided. The computer-readable medium(s) may include one or more executable programs, such as a personal electronic device program and a querying device program, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Enrollment

Referring to step 401 of FIG. 4, enrollment of an individual and at least one of the individual's personal electronic devices may be initiated. In one or more embodiments, a supporting querying device having greater hardware resources than typical IoT devices may conduct all or a significant portion of the steps of enrollment. The supporting querying device may comprise a server. In one or more embodiments, enrollment may be conducted by a querying device that also performs an "end use" or operation based at least in part on real-time authentication of an enrolled individual (i.e., a use or operation unrelated to enrollment/management of the authentication service itself such as, for example, where a lighting system turns on based at least in part on authentication, or a sound system chooses a playlist based at least in part on authentication). In yet another embodiment, the personal electronic device of the individual—such as a smart phone or laptop computer—may at least in part conduct the enrollment stage.

A supporting querying device (i.e., one that does not also perform an end use), such as a server, may form at least part of a service platform employed or retained by the individual to perform enrollment and/or authentication functions supporting use of the individual's end use querying devices. The end use querying devices may comprise IoT devices owned or used by the individual. The end use querying devices may include: personal electronic devices such as smartphones, smart watches, tablets, desktop computers, laptop computers or the like; application servers, communication servers, database servers, file servers, gaming servers, mail servers, print servers, web servers; smart home controllers; HVAC controllers; sound systems; lighting systems; home entertainment systems; motor-actuated garage door operation systems; or the like, and any other computing, electronic and/or IoT devices that may perform or support an operation or function based at least in part on authentication of an individual, or combinations thereof.

The end use querying devices may be configured for electronic communication with the supporting querying device(s) to receive output of the enrollment stage from the supporting querying device(s). Consequently, all or a subset of the end use querying devices may locally perform real-time authentication analyses and comparisons described below. Also or alternatively, real-time authentication analyses and comparisons may be performed by supporting querying device(s), and the end use querying devices may be configured for electronic communication with the supporting querying device(s) to receive the results of such authentication analyses. Moreover, a particular type of supporting querying device may comprise an authentication management querying device, such as a smart home controller, which manages authentication requirements and logic, end use device function(s), and authentication flows to end use device(s), and may also perform authentication analyses itself to authenticate an individual. The end use querying devices may be configured for electronic communication with such authentication management querying device(s).

In one or more embodiments, an end use querying device of the individual may conduct enrollment according to a software program stored on a memory element thereof. For example, all or some of the individual's end use querying device(s) may be configured to store and execute the software program for managing enrollment of the individual and one or more of the individual's personal electronic device(s). One or more of the end use querying device(s) may be configured for electronic communication with other of the end use querying device(s) for transmission of the results of authentication analyses outlined herein. In one or more embodiments, an authentication management querying device is configured to perform enrollment and corresponding authentication analyses, and to communicate the results of authentication analyses to end use querying device(s).

Further, in one or more embodiments a personal electronic device of the individual may perform enrollment according to a software program stored on a memory element thereof. Where enrollment includes training a machine learning algorithm using enrollment data, for example, modern smart phones may have hardware resources sufficient to perform such training operations. In an example, an individual's smart phone may both conduct enrollment and collect the enrollment data without departing from the spirit of the present invention. Moreover, the software program of the personal electronic device may comprise a mobile application configured to: 1) conduct at least some enrollment operations, 2) execute instructions for collecting enrollment data and active behavioral data (described in more detail below), 3) perform authentication analyses, 4) execute end uses based on the results of the authentication analyses, and/or 5) transmit the results of the authentication analyses (e.g., in the form of a confirmation of authentication of the individual) to end use and/or authentication management querying devices for remote performance of end uses.

The enrolling electronic device generates an active behavioral profile, as described in more detail below, and may be configured to initiate enrollment upon receipt of a request for enrollment originating with the individual. The request may, for example, be generated by a software program installed on a personal electronic device. In one or more embodiments, the software program comprises the mobile application installed on a personal electronic device—such as a smart phone or a laptop computer—of the individual.

The request may be accompanied by and/or correspond to identification of one or more personal electronic devices of the individual and data types to be provided by the one or more personal electronic devices in association with enrollment and real-time authentication analyses. In one or more embodiments, the mobile application installed on the smart phone of the individual may be configured to automatically detect or receive manual selection from the individual of the sensing and data capabilities of the smart phone and any subsidiary or other personal electronic devices of the individual.

Subsidiary personal electronic devices may include telematics devices, onboard vehicle computers, laptop computers or other personal electronic devices of the individual that may gather and/or report data regarding the individual, his or her surroundings and/or behaviors or actions, and any of the physical states or phenomena and/or changes in physical states or phenomena of any of the foregoing. The smart phone or other personal electronic device of the individual that manages communications with the enrolling electronic device may also manage collection and/or transmission of enrollment data and/or active behavioral data for itself and/or one or more of the subsidiary personal electronic devices.

The mobile application may also be configured to receive manual selections by the individual, e.g., via a user interface such as a touchscreen or other peripheral input/output device, regarding which of the sensing and data capabilities of the personal electronic device(s) may be used by the mobile application to support enrollment and/or real-time authentication processes according to embodiments of the present invention. For example, the individual may, in view of privacy considerations, select accelerometer and gyroscope data for use in enrollment and authentication processes, while prohibiting use/transmission of data from the photographic element and location determining element.

The mobile application may also or alternatively be configured to permit the individual to select data types that may be calculated and/or transmitted in support of enrollment and/or real-time authentication processes. For example, the individual may permit calculation and transmission of data regarding patterns of use of a user interface (e.g., touchscreen) of the personal electronic device, such as typing speed or frequency of errors. For another example, the individual may prohibit transmission of other data types such as frequency of failed authentication events attempted at the personal electronic device, or patterns of usage of particular words and/or non-words used by the individual that have been learned by the personal electronic device.

In this manner, the individual may tailor the types of hardware output and data he or she wishes to use for creation of one or more active behavioral profiles and real-time authentication analyses outlined in more detail below. One of ordinary skill will appreciate that the mobile application outlined above is merely exemplary, and that all or some of the personal electronic devices of the individual may execute other software program(s) in support of the processes outlined herein within the scope of the present invention.

The initiation of enrollment under step 401 may form a portion of a user setup process, which may in many respects be conducted in a manner known in the art. For example, the mobile application may also ask the individual to create an account and login credentials, select a service type, enter payment information, and otherwise provide information and input required to set up enrollment and authentication services of the type(s) outlined herein.

Other aspects of a setup process according to embodiments of the present invention may include identification of one or more end use querying devices and creation of one or more device profiles corresponding thereto. For example, a user may identify an authentication management querying device and/or one or more end use querying device(s), as well as one or more communication links and/or device addresses (e.g., IP address, MAC address, or the like) for the authentication management querying device and/or the end use querying device(s) to enable electronic communication between the personal electronic device(s) and the querying device(s) and, optionally, between certain of the querying devices (e.g., between the authentication management querying device, other supporting querying device(s) and/or end use querying device(s)). The setup process may further include steps for enabling such electronic communication, such as by configuring the communication links to enable the required electronic communication between the devices during applicable time intervals corresponding to enrollment and/or real-time authentication operations described herein.

Device profiles corresponding to end use querying devices may be configured to define end uses governed by authentication procedures outlined herein, corresponding permitted individual(s), and/or levels of authentication required for each such end use or group of end uses, including with respect to permitted individual(s). For example, an individual may, as part of a setup process, be prompted—e.g., at a user interface of a personal electronic device executing a mobile application directed to enrollment operations—to define a plurality of end use querying devices, a plurality of end use functions of those querying devices, and a plurality of individuals whose presence and/or command(s) may trigger real-time authentication to enable performance of the end use functions.

In one or more embodiments, the individual may select a plurality of IoT device-types via the mobile application, and may specifically identify and enable corresponding end use querying devices within the system, as outlined in more detail above. The individual may further define one or more individuals, preferably including himself/herself, for instance by assigning unique identifiers (such as names) to each of the individuals via the mobile application.

The individual may still further assign one or more end use operations or functions to each of the querying devices via the mobile application. The individual may also select one or more of the defined querying device operations or functions and assign it to one or more specific individuals to be enrolled. The individual may yet still further customize the conditions under which the end use querying device functions are preferably performed, assuming applicable authentication requirements are satisfied, such as when the assigned individual is within a certain proximity of the querying device in question, when the assigned individual issues a corresponding command with respect to the querying device in question, or otherwise.

The assignment of querying devices and end use functions to individuals and conditions, as described herein, may be performed in conjunction with or via one or more authentication management querying devices, such as a smart home controller, which may reduce the duration and complexity of setup processes. For example, the functions of end use querying devices may already be encoded in control software of such authentication management querying device(s), reducing the setup time and/or coding required to link an actuating mechanism to a particular end use, to configure any requisite device permissions, or the like. One of ordinary skill will appreciate that a variety of setup procedures may be implemented, and combinations of querying devices employed, without departing from the spirit of the present invention.

Moreover, the individual may customize the level and/or types of authentication required for performance of each end use querying device operation or function, including with respect to each of the defined individuals. That is, a particular combination of data and/or authentication types may be selected for each pairing of an individual with an end use of an end use querying device. For example, an end use querying device function of remotely operating an automatic door deadbolt may be configured to require heightened authentication requirements (such as where active and passive factors are included in authentication) whereas an end use querying device function of activating exterior floodlights may be configured to require lesser authentication requirements (such as where only minimally invasive active factors are included in authentication). For another example, authentication for the same end use querying device function may vary across individuals, for example based on the individuals' varied selection of data and/or sensor types permitted for use in authentication processes. It is also foreseen that generating active behavioral profiles and machine learning algorithms to accurately perform authentication processes for each individual may require analysis of data differently across individuals, for instance based on differences in recognizable and/or unique behaviors between individuals and/or on differences in permitted data and/or sensor types.

Where the individual managing the enrollment process is defining multiple individual users to the system, it is foreseen that some of the plurality of personal electronic devices being defined and set up for use in embodiments of the present invention may belong to such other individuals. One of ordinary skill will appreciate, therefore, that a setup process may include steps for seeking and obtaining approval from the other individuals for use of such other personal electronic devices within the system. One of ordinary skill will also appreciate that certain setup steps—such as steps for enabling electronic communication, e.g., by configuring communication links to enable electronic communication between the devices during applicable time intervals corresponding to enrollment and/or authentication operations described herein—may need to be performed by such other individuals. Moreover, it is foreseen that all or some of the privacy- and/or battery-life-related customizations outlined above—e.g., where an individual selects which sensors and/or data types may be used during enrollment and/or real-time authentication operations—may be performed by the other individuals with respect to corresponding personal electronic devices.

Referring to step 402, enrollment data may be collected from the at least one personal electronic device. One of ordinary skill will appreciate that one or more querying device(s) may also serve as personal electronic device(s) transmitting enrollment data, such as where a home security system comprises end use querying devices configured to perform at least one end use function and includes a camera, the camera being utilized to collect enrollment data regarding the individual.

In one or more embodiments, the personal electronic device and/or enrolling electronic device receives the enrollment data. For example, a supporting querying device comprising a server may receive enrollment data from a plurality of personal electronic devices belonging to a plurality of individuals enrolling under a single account (e.g., a family enrolling together under an account of a managing individual). For another example, the smart phone or other personal electronic device of the individual may generate and/or receive the enrollment data in connection with development of one or more active behavioral profile(s).

The enrollment data may be collected by a single personal electronic device for transmission, or may be transmitted individually by the personal electronic devices, according to selections made during setup and/or the dictates of the software program(s) managing the enrollment process.

It should also be appreciated that enrollment may be conducted outside of one-time and/or discrete/limited time periods in embodiments of the present invention. For example, receipt of enrollment data useful in building and/or revising machine learning algorithms for performing real-time authentication processes may occur in connection with setup and/or periodically or on a rolling basis thereafter, for example in connection with retraining such algorithm(s), without departing from the spirit of the present invention.

It is also foreseen that the timing of collection of enrollment data may be at least partly facilitated by manual intervention of/input by the individual(s) and/or by automated sensing performed by the personal electronic device(s) generally or according to particular configurations for the enrollment processes. In one or more embodiments, an individual may be instructed by a mobile application to provide manual input in each instance where relevant enrollment data may be collected.

For example, where a querying device comprises a "home lighting system" performing a "lights on" end use based at least in part on an individual's "proximity" to a residence—e.g., according to the individual's selections during setup—the mobile application of the individual's smart phone may be configured to prompt the user for manual input whenever the individual is within or near the pre-determined proximity to trigger collection and/or transmission of corresponding enrollment data.

For another example, the individual may permit use of certain automated sensing/data collection mechanisms of corresponding personal electronic device(s) to facilitate enrollment, even where such data/sensors may not be used during normal authentication processes.

For yet another example, even where an individual chooses not to permit data regarding unrelated authentication events on a smart phone to be transmitted/considered in connection with real-time authentication, he or she may permit transmission/use of such information during enrollment (only), for example to provide feedback useful in improving the accuracy of trained machine learning algorithms and/or otherwise in generating active behavioral profiles.

Referring to step 403, at least one pattern may be detected in the enrollment data. In one or more embodiments, pattern detection includes or is preceded by a data segmentation step. Data segmentation may include identifying various sub combinations of data available from the individual's personal electronic device(s). The sub combinations may be identified using sheer computation—such as where all possible sub combinations of data types are generated—and/or using pre-determined data availability groupings.

For example, data availability groupings may be formed by analyzing data from a larger population that reflects commonly-designated personal electronic devices and data types over time and across changing conditions. In one or more embodiments, high-quality smart phone GPS data may be most widely available across time (e.g., because the smart phone is almost always in the possession of an individual, the GPS signal is stronger than other signal types, GPS data does not depend on the orientation or disposition of the phone, etc.), and high-quality tablet photographic element data may be among the least frequently available data (e.g., because tablets are infrequently proximate the individual, require affirmative activation by the individual for data collection, must be in communication with a wireless network for data transmission, are often poorly-oriented for collection of optical data, etc.).

In one or more embodiments, sub combinations are categorized at least in part based on time and/or are customized based on region (e.g., where the quality of available data varies across geographic region and corresponding differences in device usage). Where sub combinations are categorized at least in part based on time, it may be apparent that certain devices and/or sensors produce higher quality data during certain timeframes, and lower quality data during other timeframes.

Moreover, sub combinations may be categorized at least in part based on the information available about the individual in question. For example, an older individual may be less likely to produce high quality data via photographic element of a mobile device than a younger individual.

Based at least in part on such considerations and empirical data of a broader population, data availability groupings may be formed to drive selection or prioritization of sub combinations of available data. It is foreseen that optimal combinations of these considerations may be determined to drive selection or prioritization of sub combinations of available data to form data availability groupings.

In one or more embodiments, enrollment data (and corresponding anonymous data discussed below in connection with supervised learning) are organized according to such sub combinations into the data availability groupings, and the enrollment data is used separately, according to such data availability groupings, in identification of one or more patterns according to the discussion below.

All or part of the enrollment data—whether raw or grouped according to data availability groupings—may be analyzed to detect the at least one pattern. For example, the software program of the enrolling electronic device may utilize machine learning programs or techniques to perform pattern recognition analyses. In one or more embodiments, the program may scrutinize the enrollment data or a subset thereof using one or more machine learning techniques to generate one or more correlations or other relational observations. The program and/or machine learning program(s) may therefore recognize or determine patterns and/or correlations between expected or normal behavior on the one hand, and actual individual behavior on the other hand. The machine learning techniques or programs may include curve fitting, regression model builders, convolutional or deep learning neural networks, combined deep learning, pattern recognition, or the like. Based upon this data analysis, the program and/or machine learning program(s) may flag certain patterns for incorporation into an active behavioral profile, as discussed in more detail below.

In supervised machine learning, the program may be provided with enrollment data of a particular data availability grouping (example inputs), as well as example outputs corresponding to the desired identification/authentication result (i.e., the data correspond to the individual in question or another individual). Preferably, therefore, embodiments of the present invention include a database of anonymized sensor and other data discussed herein for use in supervised training as data corresponding to "another individual" output results. Such enrollment data may be inputted into the program to discover a general rule that maps inputs to outputs, so that when subsequent novel inputs are provided during authentication processes, the correct output (i.e., authentication/identification) may be accurately predicted based at least in part on the discovered rule.

In unsupervised machine learning, the program may be required to find its own structure in unlabeled example inputs.

The program may utilize classification algorithms such as Bayesian classifiers and decision trees, sets of pre-determined rules, and/or other algorithms to generate flags for anomalous behavior. Moreover, in a preferred embodiment, different and/or separately-trained algorithms and models are optimized for use in detecting respective types of anomalous behaviors.

In this manner, multiple patterns may be identified for each data availability grouping, and each individual may be associated with a plurality of data availability groupings. For example, a first data availability grouping of a working individual may comprise GPS data collected from a smart phone and telematics device between the hours of 7 a.m. and 9 a.m. or 4 p.m. to 6 p.m., and a second data availability grouping of the individual may comprise user interface interactions on the smart phone and a laptop computer between the hours of 9 a.m. and 4 p.m.

Machine learning algorithm(s) may be trained using enrollment data of the first data availability grouping to identify a plurality of distinct patterns—e.g., a commute between work and home generally corresponding to workdays, and a path between home and a nearby gym corresponding to any day of the week.

Further, machine learning algorithm(s) may be trained using enrollment data of the second data availability grouping to identify a plurality of distinct patterns—e.g., a ratio of mistyped words to typing speed measured at a user interface of the laptop computer, a frequency of interaction with one or more mobile application(s), or the like.

As outlined above, pattern(s) reflecting the behavior of an individual may be embodied in algorithm(s) other than machine learning algorithm(s)—e.g., within pre-determined rule sets or the like—within the scope of the present invention. Moreover, it is foreseen that all or some of the data defining such pattern(s) may be specified by the individual(s) in question, for example where an individual specifies typical work commute hours during a setup process.

In addition, each pattern may be associated with a confidence rating based, at least in part, on empirical observations of the reliability of a particular data availability grouping and/or pattern-type. For example, where it has been observed that certain data entry patterns observed via data collected at a user interface of an individual's smart phone are highly unique to the individual, and consistent across time, active behavioral profile(s) incorporating consideration of such data entry patterns may receive high confidence ratings. Moreover, confidence ratings, data collection instructions and the like may be time-sensitive. For example, a confidence rating relating to an active behavioral profile that incorporates consideration of such data entry patterns may drop over time as the data reflecting the patterns ages.

One of ordinary skill will also appreciate that such confidence ratings may permit the patterns to be organized into a hierarchy progressing from preferred to less-preferred patterns, which will be discussed in more detail below.

Referring to step 404, an active behavioral profile may be generated based at least in part on the pattern(s) in the enrollment data. In one or more embodiments, the active behavioral profile may comprise a distillation of the most distinct aspects of the pattern(s) identified pursuant to step 403. Moreover, in a preferred embodiment, the active behavioral profile comprises a plurality of patterns respectively with isolated, overlapping, or coexistent application to active behavioral data collected in support of authentication processes discussed in more detail below.

The active behavioral profile for an individual is preferably formatted for quick reference in support of such real-time authentication processes. For example, the distinct aspects of an identified pattern may be distilled into one or more datapoint definitions, wherein the datapoint definitions precisely describe the input active behavioral data required to match the identified pattern, as well as permitted deviation from each datapoint definition and/or aggregate permitted deviation. In this manner, the active behavioral profile preferably represents a quick-reference model of expected behavior for each enrolled individual.

In one or more embodiments, the active behavioral profile(s) for each enrolled individual are transmitted to each device that is to be configured to perform real-time authentication analyses (i.e., comparisons against active behavioral data described below). Moreover, data collection instructions may be transmitted for each of the personal electronic device(s). For example, the data collection instructions may be based on and/or comprise the datapoint definitions, and may define the data types, data collection timeframes and/or data collection triggers necessary to collect data that matches the datapoint definitions of the active behavioral profile(s).

It is foreseen that additional steps may be performed in support of individual/personal electronic device enrollment without departing from the spirit of the present invention.

Authentication

Referring to step 405, active behavioral data may be received from the at least one personal electronic device. Transmission and/or receipt of active behavioral data may be continuous, performed at intervals, and/or according to one or more triggers encoded in a program of each personal electronic device. Data collection timing and composition may be determined according to data collection instructions discussed above, or according to other pre-determined configurations (e.g., as encoded within the settings of a mobile application of an individual's smart phone).

For example, GPS data may be collected and transmitted from an individual's smart phone only during certain timeframes, in connection with analyses against one or more active behavioral profile(s) that include pattern(s) based on data collected under the exemplary first data availability grouping described above. For another example, user interface interaction data may be collected and transmitted from the smart phone during other timeframes, in connection with analyses against one or more active behavioral profile(s) that include pattern(s) based on data collected under the exemplary second data availability grouping described above.

In one or more embodiments, data collection may also or alternatively be triggered by one or more event(s), which may be detected by one or more sensor(s) of the personal electronic device(s) and/or by other electronic device(s). For example, proximity of a family car to a residence—e.g., as determined by GPS data captured from a location determining element of a telematics device mounted in the family vehicle—may trigger data collection of the same and/or different types of data on all or a plurality of personal electronic devices of individuals within the family. The data collection from the personal electronic devices of the family members may establish which personal electronic device(s) are near the family vehicle, and may provide further datapoints with which to confidently identify/authenticate the individual(s) in the vehicle.

One of ordinary skill will appreciate that several different collection schemes for active behavioral data may be implemented in support of a single active behavioral profile without departing from the spirit of the present invention. Further, it is foreseen that active behavioral data collection may be conducted beyond the scope—e.g., with respect to time period, data type, sensor type, etc.—required by data collection instructions or the like for analyses against corresponding active behavioral profile(s). This may facilitate supplemental analyses, where necessary, and/or may better ensure that relevant data within said scope is available. Moreover, such additional active behavioral data may periodically or continuously be utilized by the electronic device(s) responsible for generating and/or updating the active behavioral profile(s) to update or retrain the algorithm(s) of the active behavioral profile(s). One of ordinary skill will appreciate that periodic or continuous retraining or regeneration of improved active behavioral profile(s) may include transmitting corresponding updated data collection instructions to the personal electronic device(s). A schedule implemented according to settings of one or more software programs and/or selections of the individual during setup may govern the frequency and/or type(s) of retraining and/or regeneration of active behavioral profiles conducted according to embodiments of the present invention.

The active behavioral data may comprise data regarding the individual, his or her surroundings and/or behaviors or actions, and any of the physical states or phenomena and/or changes in physical states or phenomena of any of the foregoing. As noted above, exemplary active behavioral data may include vehicle seat positioning; vehicle geolocation patterns; vehicle sound system operation and programming; vehicle heating/cooling settings in view of external and internal temperature(s); height and/or movement patterns of the personal electronic device within the vehicle; data entry patterns of the user at a user interface of the personal electronic device; successful completion of past authentication events involving the individual conducted on the smart phone; objects frequently found proximate the photographic element of the smart phone; phone position in three-dimensional space indicating posture; phone movements indicating pattern of movements of the individual under authentication scrutiny; timestamp data associated with one or more recorded system event(s) or sensor data acquisitions, which may be associated with normal behavioral patterns of the individual under authentication scrutiny; proximity of at least one querying device to another object or entity; speed of activities of the individual under authentication scrutiny recorded at a user interface, for instance speed and/or quality of input such as typing; video and/or microphone sensor data captured without specific request or challenge to the individual under authentication scrutiny; vehicle speed/directionality; mobile device elevation (e.g., as it relates to vehicle height, if no onboard devices on the car are available to verify its identity); mobile device (e.g., phone) orientation/location within the car; data regarding the individual's handling of a mobile device at a particular time and/or in connection with a particular task; proximity of multiple querying devices or other objects (e.g., as recorded by a camera of the mobile device), and other such information or a combination of any of the foregoing.

Referring to step 406, an active behavioral profile may be retrieved. It is foreseen that a plurality of active behavioral profile(s) may be retrieved to perform a single authentication and/or multiple related authentication operations without departing from the spirit of the present invention.

Retrieval of related active behavioral profile(s) may at least in part be governed by the pattern confidence hierarchy enabled by confidence ratings discussed above. More particularly, the data collection instructions, datapoint definitions and/or other specifications applicable to analyses against available active behavioral profiles may specify a scope of required active behavioral data necessary for analyses against a particular active behavioral profile, and may optionally specify an optimal scope of active behavioral data for the active behavioral profile.

Such specifications may include metrics for analyzing the quality of data received from the personal electronic devices, and data quality may be considered in connection with the pattern confidence hierarchy to select and/or order the available active behavioral profile(s). For example, poor or spotty collection and/or transmission of a particular data type may be reflected in data quality assessment(s). For another example, active behavioral data collected by particular personal electronic device(s) may be omitted from analyses entirely, such as where certain quality threshold indicators are not met. In one or more embodiments, the personal electronic device may fail to meet a threshold inquiry or analysis for relevance, such as where the individual's smart phone travels at high-speed independent of the individual's vehicle. In such scenarios, data quality metrics may recommend omission of data from the vehicle under the assumption that the individual was not recently in his or her vehicle.

The querying device—e.g., the authentication management querying device and/or end use querying device—performing authentication analyses may consider the scope and quality of data received from the personal electronic device(s), alone or in conjunction with a pattern confidence hierarchy outlined above, when determining which active behavioral profile(s) to retrieve and analyze against the active behavioral data and/or when determining a weighting to apply to the output of such analyses. More particularly, it is foreseen that multiple active behavioral profiles may be independently analyzed against received active behavioral data—for example, where at least the minimum required data has been received for each such active behavioral profile—and results thereof may be aggregated according to a weighted summation, logic tree or the like to determine a final result of the authentication analysis, as discussed in more detail below.

In one or more embodiments, when an authentication event occurs and/or on a continuous basis, the scope and quality of available active behavioral data may be assessed to determine which data availability groups are adequately represented and/or which data collection instructions have been sufficiently adhered to. Where the available active behavioral data meets minimum requirements for a plurality of profiles, one or more profiles having greater confidence rating(s) may be selected for analysis from among the remaining plurality of profiles. Alternatively, the plurality of profiles or a subset thereof may be analyzed together, as discussed in more detail below. The preferred active behavioral profiles may be retrieved accordingly.

Referring to step 407, the retrieved active behavioral profile(s) may be compared and/or analyzed against the received active behavioral data. As outlined above, the retrieved active behavioral profile(s) may represent a subset of all available active behavioral profile(s) corresponding to an individual to be authenticated.

The analysis may involve pre-processing of the active behavioral data according to datapoint definitions describing the desired input for analyses. For example, an active behavioral profile may comprise a neural network model trained to consider four (4) separate data types. The four (4) data types may relate to smart phone and telematics device data, such as GPS data over the preceding three (3) hours, smart phone orientation, ambient light level as determined via smart phone sensor(s), and vehicle stereo settings (e.g., relating to the source of digital content being played on the stereo). The neural network model may consume as input the following datapoints derived from the aforementioned general data types: whether either of the vehicle or smart phone have been within one hundred feet (100 ft.) of a specified location within the preceding three (3) hours; whether the smart phone has been laying in a relatively flat position for at least a threshold percentage of the most recent trip; whether the detected ambient light level indicates the smart phone has been held in a darkened, confined space (e.g., a pocket or a purse) for at least a threshold percentage of the most recent trip; and whether the smart phone was the primary source of digital content played over the vehicle stereo system during the most recent trip. The raw active behavioral data received from the personal electronic devices of the individual may be pre-processed according to such datapoint definitions for input into the neural network model.

One of ordinary skill will appreciate that similar pre-processing may be conducted—depending at least in part on the raw active behavioral data received and the input requirements of the various type(s) of active behavioral profile(s) in question—without departing from the spirit of the present invention. One of ordinary skill will also appreciate that the active behavioral data may be filtered and/or pre-processed to satisfy the desired datapoint definitions prior to transmission from the personal electronic device(s) without departing from the spirit of the present invention.

As noted above, properly formatted active behavioral data may be input to and/or be compared against the selected/applicable active behavioral profile(s) to generate one or more output(s). The one or more output(s) may reflect how closely the active behavioral data match the pattern(s) reflected in the active behavioral profile(s) and/or whether the active behavioral data are within particular threshold(s) reflected in the active behavioral profile(s).

In the example above, the neural network model of a first active behavioral profile may output a determination that first active behavioral data indicate it is forty-five percent (45%) likely that the individual matches the expected behavior. Further a second active behavioral profile—built on a distinct data availability grouping from the first—may comprise a decision tree that, when compared against second active behavioral data, indicates a ninety-five percent (95%) likelihood that the individual matches the expected behavior. The two outputs may be summed in a weighted summation—e.g., weighted according to confidence rating(s) and/or pattern confidence hierarchy—and the sum may be compared against a threshold for determining whether authentication was successful. Also or alternatively, the two outputs may be considered against a set of rules for determining an all-or-nothing "winner." More particularly, the rules may require an "authenticated" result if the second (or any) output of a plurality of active behavioral profile(s) exceeds ninety percent (90%) where none of the outputs are below forty percent (40%). Accordingly, one or more output(s) of comparisons of active behavioral data against active behavioral profile(s) may be analyzed to generate a final output or authorization notification.

One of ordinary skill will appreciate that a variety of summations, prioritizations and rules may be implemented to sort and/or weigh the outputs of variously-configured active behavioral profile(s) and generate an authorization notification without departing from the spirit of the present invention.

As noted above, analysis of one or more output(s) may generally yield an authorization notification indicating that authorization has been completed with respect to an individual and/or with respect to performance of certain end use(s). In one or more embodiments, authorization with respect to all or some end use(s) and/or individual(s) may require satisfaction of additional authentication factor(s), such as via passive authentication challenges. For example, a managing querying device may relay an "authenticated" notification to an HVAC system of a residence based on the thresholds satisfied by authentication analyses, but may initially hold a conditional authentication status for a deadbolt actuator IoT device of the residence, requiring satisfaction of at least one additional authentication factor to release a full authentication notification.

The managing querying device may, accordingly, issue a passive authentication challenge to a smart phone of the individual, requiring entry of a password, presentation of a body part to a sensor of the smart phone, or the like for matching against an expected response to complete the authentication. Such passive authentication challenges are generally known in the art. Following satisfaction of the passive authentication challenge, if any, the managing querying device may issue the authentication notification to the deadbolt actuator IoT device.

In one or more embodiments, failure of authentication based on active authentication procedures outlined above may be remedied with one or more passive authentication factors outlined herein. In still another embodiment, the managing querying device may automatically select one or more secondary or supplemental passive authentication factors to require based at least in part on the output(s) of comparison of the active behavioral data against one or more active behavioral profile(s). For example, receipt of an outright failure of authentication based on the comparison may cause the managing querying device to automatically select—e.g., according to pre-programming and/or configuration by the individual during enrollment and setup—a more onerous regime or set of passive authentication factors that must be satisfied to complete authentication. A conditional authentication status, on the other hand, may cause the managing querying device to automatically select a less onerous set of passive authentication factors to complete authentication.

One of ordinary skill will appreciate that a variety of control logics may be used to define types of authentication factor(s) required to complete authentication with respect to any given individual/end use pairing within the scope of the present invention.

Once authentication has occurred, based at least in part on the authentication procedure, the authentication may stay "green" or active for a pre-determined period of time, may be applicable against a certain class of actions or end uses to be performed by the querying device(s), may be active until one or more event(s) and/or data occur or are received, or may be otherwise limited in its duration or scope within the scope of the present invention. Moreover, the authentication notification may be communicated across multiple IoT or other querying devices. Such forwarded or transmitted authentications may have a limited life (e.g., according to automatic association with a timer or clock cycle which expires on a pre-determined schedule).

It is also foreseen that secondary authentication procedures may be performed by recipient querying devices, rather than the managing querying device, without departing from the spirit of the present invention.

In one or more embodiments, completion of the authentication cycle leads directly to a permitted act or end use authorized by the querying device. For instance, the querying device may, based upon completed authentication, signal proper authentication to an actuator that unlocks a door, provide access to a database for access by the personal electronic device, transmit a request received from the personal electronic device to another querying device as an authenticated message, or otherwise act in favor of the personal electronic device as a result of the proper authentication. One of ordinary skill will appreciate that such a permitted act or end use may be a single action (such as unlocking a door), may comprise permitting access for a limited period of time (such as where access to a database is provided for a limited period of time) or may be otherwise configured within the scope of the present invention.

In one or more embodiments, failure to reach a satisfactory threshold for authentication of an individual based on analysis of the active behavioral data against the active behavioral profile(s) may cause the managing querying device or another supporting querying device to generate an alert or notification to the enrolled individual. The alert may be transmitted via one or more communication media selected and configured by the enrolled individual during setup. The alert may indicate that a certain fraud-detection threshold has been reached through analysis of active behavioral data transmitted from one or more of the individual's personal electronic device(s), and recommend that the individual check the personal electronic device(s) for theft or security breach.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A computer-implemented method for authentication of an individual having a personal electronic device, the method comprising:
   initiating an enrollment period for the individual, the personal electronic device and a second personal electronic device;
   collecting enrollment data at least partly from the personal electronic device and the second personal electronic device during the enrollment period;
   generating, via a first machine learning algorithm, a single-device active behavioral profile based on a first portion of the enrollment data collected from the personal electronic device;
   generating, via a second machine learning algorithm, an active behavioral profile based on the first portion of the enrollment data and a second portion of the enrollment data collected from the second personal electronic device;
   receiving active behavioral data from the personal electronic device;
   determining that the active behavioral data include data originating with the personal electronic device and the second personal electronic device;
   based at least in part on the determination of origin, selecting the active behavioral profile from among the active behavioral profile and the single-device active behavioral profile;
   retrieving the active behavioral profile corresponding to the individual;
   comparing the active behavioral data with the active behavioral profile; and
   authenticating the individual based at least in part on the comparison.

2. The computer-implemented method of claim 1, wherein the active behavioral data comprises sensor data generated by the personal electronic device.

3. The computer-implemented method of claim 2, wherein—
   the personal electronic device comprises a smart phone,
   the sensor data is generated by one or both of a gyroscope and an accelerometer of the smart phone,
   the active behavioral profile at least in part reflects movement patterns of the smart phone.

4. The computer-implemented method of claim 2, wherein— the personal electronic device comprises a smart phone,
the sensor data is generated by a location determining element,
the active behavioral profile at least in part reflects location patterns of the smart phone.

5. The computer-implemented method of claim 1, wherein—
generating the active behavioral profile includes distinguishing patterns in the enrollment data.

6. The computer-implemented method of claim 5, wherein the patterns are distinguished through application of a machine learning algorithm to the enrollment data.

7. The computer-implemented method of claim 1, wherein the authentication of the individual further includes—
determining that the comparison of the active behavioral data against the active behavioral profile is inconclusive,
based at least in part on the determination that the comparison is inconclusive, issuing a passive authentication challenge demanding a response by the individual of one or more of the following types: performance of a pre-determined authentication act; possession of a pre-determined authentication device; and presentation of a pre-determined aspect of the individual's physical features or manifestations for recordation by a sensor of the personal electronic device,
receiving the response,
matching the response against an expected response to complete the authentication.

8. The computer-implemented method of claim 1, further comprising transmitting notification of the authentication of the individual to a querying device, the querying device being configured to perform an operation requested by the individual, based at least in part on the notification of the authentication.

9. The computer-implemented method of claim 1, wherein the authentication is performed by a querying device configured to perform an operation requested by the individual based at least in part on the authentication.

10. A system for authentication, comprising:
a personal electronic device of an individual, the personal electronic device including a communication element;
a second personal electronic device; and
a querying device including non-transitory computer-readable media having computer-readable instructions instructing completion of the following steps by at least one processing element—
initiate an enrollment period for the individual, the personal electronic device and the second personal electronic device;
collect enrollment data at least partly from the personal electronic device and the second personal electronic device during the enrollment period;
generate, via a first machine learning algorithm, a single-device active behavioral profile based on a first portion of the enrollment data collected from the personal electronic device;
generate, via a second machine learning algorithm, the active behavioral profile based on the first portion of the enrollment data and a second portion of the enrollment data collected from the second personal electronic device;
receive active behavioral data from the communication element of the personal electronic device;
determine that the active behavioral data include data originating with the personal electronic device and the second personal electronic device;
based at least in part on the determination of origin, select the active behavioral profile from among the active behavioral profile and the single-device active behavioral profile;
retrieve the active behavioral profile corresponding to the individual;
compare the active behavioral data with the active behavioral profile; and
authenticate the individual based at least in part on the comparison.

11. The system of claim 10, wherein the active behavioral data comprise sensor data generated by the personal electronic device.

12. The system of claim 11, wherein—
the personal electronic device comprises a smart phone,
the sensor data is generated by one or both of a gyroscope and an accelerometer of the smart phone,
the active behavioral profile at least in part reflects movement patterns of the smart phone.

13. The system of claim 11, wherein—
the personal electronic device comprises a smart phone,
the sensor data is generated by a location determining element,
the active behavioral profile at least in part reflects location patterns of the smart phone.

14. The system of claim 10, wherein—
generating the active behavioral profile includes distinguishing patterns in the enrollment data.

15. The system of claim 14, wherein the patterns are distinguished through application of a machine learning algorithm to the enrollment data.

16. The system of claim 10, wherein the computer-readable instructions further instruct completion of the following steps by the at least one processing element in connection with authentication of the individual—
determine that the comparison of the active behavioral data against the active behavioral profile is inconclusive,
based at least in part on the determination that the comparison is inconclusive, issue a passive authentication challenge demanding a response by the individual of one or more of the following types: performance of a pre-determined authentication act; possession of a pre-determined authentication device; and presentation of a pre-determined aspect of the individual's physical features or manifestations for recordation by a sensor of the personal electronic device,
receive the response,
match the response against an expected response to complete the authentication.

17. The system of claim 10, wherein the computer-readable instructions further instruct completion of the following steps by the at least one processing element—
transmit notification of the authentication of the individual to a querying device, the querying device being configured to perform an operation requested by the individual, based at least in part on the notification of the authentication.

18. The system of claim 10, wherein the at least one processing element forms part of a querying device, and the computer-readable instructions further instruct completion of the following steps by the at least one processing element— perform an operation requested by the individual based at least in part on the authentication.

\* \* \* \* \*